No. 767,894. Patented August 16, 1904.

UNITED STATES PATENT OFFICE.

GEORGE J. KAUFMANN, OF NEW YORK, N. Y.

COLORING-MATTER AND METHOD OF PRODUCING SAME.

SPECIFICATION forming part of Letters Patent No. 767,894, dated August 16, 1904.

Application filed March 8, 1904. Serial No. 197,166. (No specimens.)

*To all whom it may concern:*

Be it known that I, GEORGE J. KAUFMANN, a subject of the King of Würtemberg, and a resident of the city of New York, borough of Manhattan, in the county and State of New York, have invented a new and Improved Coloring-Matter and Method of Producing the Same, of which the following is a full, clear, and exact description.

The invention relates to mineral paints; and its object is to provide a new and improved coloring-matter and method for producing the same, the coloring-matter being an equivalent of both raw and burnt terra di sienna and on being mixed with oil, water, or other liquid readily forms a paint for immediate use in graining and staining without any addition of burnt umber, Van Dyke brown, or the like or for the painting of houses, &c., for calcimining and tinting or for use as a substitute for ocher.

The coloring-matter consists, essentially, of humus, argillaceous earth, silicate of soda, manganic hydroxid, (manganite,) silicate of magnesia, sulfate of lime, calcium carbonate, hydrated peroxid of iron, sulfid of iron, and magnesia sulfite.

The raw material or mineral earth of a plastic consistency and from which the coloring-matter is produced is found as a natural product or deposit in the State of New York and other parts of the United States in the form of a moist amorphous substance of a mixed yellow color of a readily-breakable nature. This product or deposit consists of the following ingredients in about the proportions stated: moisture, 8.10 per cent.; organic humus substance, 5.08 per cent.; argillaceous earth or aluminium hydroxid, 18.12 per cent.; silicate of soda, six per cent.; manganic hydroxid, twelve per cent.; silicate of magnesia, 7.42 per cent.; sulfate of lime, fifteen per cent.; hydrated peroxid of iron, eighteen per cent.; calcium carbonate, two per cent.; sulfid of iron, 8.03 per cent.; magnesia sulfite, 0.25 per cent.—total, one hundred per cent. In order to produce the desired coloring-matter from this natural product, I proceed as follows: After the raw material is removed from its bed it is subjected to the influence of the atmosphere and light and is then run through a sieve to remove extraneous matter, and in case sand is found in the material the sieving operation is repeated to remove the sand. If necessary, the substance is washed by the use of water and is then dried and pulverized to form the coloring-matter.

The coloring-matter mixed with water or oil produces a yellow paint very serviceable in graining, staining, or ordinary painting and also forms a substitute for terra di sienna.

The yellow paint referred to may be subjected to a heat of about 500° centigrade in a suitable apparatus under exclusion of air and for, say, about three or four hours to produce a burnt coloring-matter. By this heating process the original yellow color of the product changes to a dark red through the loss of the hydrates, and in case the heat is raised to 1,000° centigrade the product appears as a light-red color. By the addition of alkalies or hydroxids of aluminium, iron, or manganese, or metallic ores it is possible to obtain exceedingly dark-red colors, such as Indian red, &c.

The burnt coloring-matter can be readily mixed with water or oil and the paint thus produced used for light or dark staining, graining, or painting, also as a substitute for burnt terra di sienna.

Some of the mineral earth found contains as essential ingredients Venetian talcum, aluminium compounds, and sulfate of iron, and this mineral earth subjected to an ignition process produces silver or gold green bronze colors. In case the magnesium sulfite is the principal ingredient then with the additions of sulfate of uranium, stannum, or the like it is possible to produce other brilliant colors.

Although the coloring-matter produced can be used as a substitute for terra di sienna, it has the advantage that it can without any addition of burnt umber or Van Dyke brown be used directly for graining purposes. The yellow unburnt coloring-matter can be readily used with oil or other liquid for staining light or dark natural woods and for graining oak, ash, pines, walnuts, and other woods. The unburnt coloring-matter is also very serviceable for imitation of marble relief work, also as a background for marbleizing. The burnt coloring-matter mixed with oil or water can be used for light or dark red graining or staining to imitate rosewood, mahogany, and the like.

The simple manner of producing the coloring-matter permits of selling it at a lower cost than ocher, and hence it is economical when used as a substitute for ocher and other yellow colors. The burnt or unburnt coloring-matter can also be used for calcimining and tinting purposes.

Having thus described my invention, I claim as new and desire to secure by Letters Patent—

1. The coloring-matter herein described, consisting of aluminium oxid, silicate of soda, manganic oxid, silicate of magnesia, sulfate of lime, peroxid of iron, calcium carbonate, sulfid of iron and magnesia sulfite, in about the proportions specified.

2. The coloring-matter herein described, consisting of aluminium oxid, silicate of soda, manganic oxid, silicate of magnesia, sulfate of lime, peroxid of iron, calcium carbonate, sulfid of iron, magnesia sulfite and metallic ores, in about the proportions specified.

3. The coloring-matter herein described, consisting of aluminium oxid, silicate of soda, manganic oxid, silicate of magnesia, sulfate of lime, peroxid of iron, calcium carbonate, sulfid of iron, magnesia sulfite and alkalies, in about the proportions specified.

In testimony whereof I have signed my name to this specification in the presence of two subscribing witnesses.

GEORGE J. KAUFMANN.

Witnesses:
 THEO. G. HOSTER,
 EVERARD BOLTON MARSHALL.